3,324,777
AUTOMATIC EXPOSURE CONTROL APPARATUS FOR CAMERAS

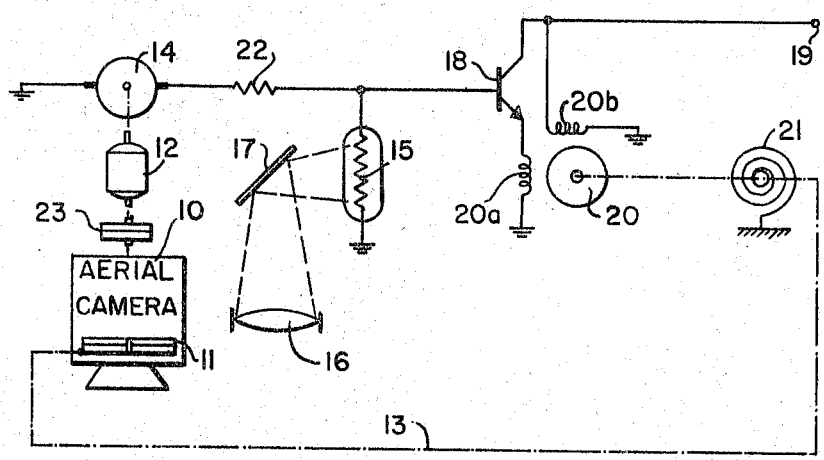

Martin Kanner, Plainview, N.Y., assignor to Fairchild Camera and Instrument Corporation, a corporation of Delaware
Filed Dec. 14, 1964, Ser. No. 418,045
7 Claims. (Cl. 95—10)

ABSTRACT OF THE DISCLOSURE

An exposure control system for an aerial camera including an adjustable-width exposure slit, the slit and the film being relatively movable, including a tachometer generator driven by the camera driving mechanism and a photoresistor illuminated directly by the scene being photographed and connected across the generator, the signal voltage across the photoresistor being utilized to energize a servo motor which adjusts the slit to maintain substantially constant exposure.

---

This invention relates to automatic exposure control apparatus for cameras and, while it is of general application, it is particularly applicable to control the exposure of cyclically repeating aerial cameras having an adjustable-width exposing slit.

In aerial photography, it is desirable to maintain a constant level of film exposure over a wide range of taking conditions, such as variations of the brightness of the scene being photographed and variations in the camera cycling or repetition rate, the latter being controlled primarily as a function of the altitude and speed of the aircraft.

Heretofore, there have been proposed systems for automatically controlling the exposure in aerial cameras in response to variations in the taking conditions but, in general, such systems have been complex and costly, involving various sensing, computing, and servomechanism devices.

It is an object of the invention, therefore, to provide a new and improved automatic exposure control apparatus for cameras of utmost simplicity and lowest cost.

It is another object of the invention to provide a new and improved automatic exposure control apparatus for cameras in which the desired control is effected by the conjoint action of a simple camera repetition rate sensor, a scene brightness sensor, and a simple mechanism responsive jointly and directly to such sensors for adjusting the camera aperture.

In accordance with the invention, an automatic exposure control apparatus for an adjustable-aperture camera including a driven exposure aperture comprises means for adjusting the aperture of the camera, means for developing an electrical signal representative of the relative exposure aperture-film velocity, a light-responsive variable impedance device, means for illuminating the variable impedance device from the scene being photographed, a circuit for applying the electrical signal to the variable impedance device, and means responsive to the signal translated by the impedance device for actuating the aperture-adjusting means in a sense tending to maintain the camera exposure constant.

For a better understanding of the present invention, together with other and further objects thereof, reference is had to the following description, taken in connection with the accompanying drawings, while its scope will be pointed out in the appended claims.

Referring to the drawing:

The single figure is a representation, partly schematic of an automatic exposure control apparatus for cameras embodying the present invention.

Referring specifically to the drawing, there is represented an automatic exposure control apparatus for a repeating adjustable-aperture camera, for example an aerial camera 10 provided with an adjustable slit 11 movable across the focal plane of the camera and including a driving mechanism, such as a motor 12, for driving the slit 11, for example, for cycling the camera for repeated exposures. This apparatus includes means for adjusting the camera aperture, specifically, the exposure slit 11, shown schematically as mechanism 13. The apparatus also includes means for developing an electrical signal representative of the relative exposure-slit film velocity specifically representative of the repetition rate or cycling of the camera which may be in the form of a D.C tachometer generator 14 driven by the motor 12.

The exposure control apparatus of the invention further comprises a fixed dropping resistor 22 and a light-responsive variable impedance device, for example a photosensitive resistance device 15, having a resistance varying approximately inversely with illumination, and connected in circuit with generator 14. One such photosensitive resistance device is fabricated of cadmium sulphide and is available under Type No. CL-705, manufactured by Clairex Corporation of New York, N.Y. The apparatus also comprises means for illuminating the photosensitive device 15 from the scene being photographed which may be in the form of an objective lens 16, the optical path of which may include suitable light-directing devices such as a mirror 17.

The exposure control apparatus of the invention further comprises means responsive to the signal translated by the photosensitive resistance device 15 for actuating the adjusting mechanism 13 in a sense tending to maintain the film exposure constant. This means may be in the form of a signal repeater, such as a transistor 18 energized from a suitable positive source such as a terminal 19. The transistor 18 is connected as an emitter-follower, its base-emitter circuit including the photosensitive resistance device 15 so that it is responsive to the signal voltage across and thus to the signal current through, that device. The apparatus further includes a torque motor 20 having one winding 20a included in the emitter circuit of the transistor 18 and a second winding 20b connected across the supply terminal 19. The torque motor 20 is connected directly to the actuating mechanism 13 to which is also connected a suitable biasing means such as a spiral spring 21. For certain applications, it may be desirable to include a manually operable clutch 23 between the motor 12 and the drive for slit 11 of camera 10.

It is believed that the operation of the automatic exposure control apparatus of the invention will be apparent from the foregoing description. In brief, from elementary photographic relations, it can be shown that for constant exposure by an adjustable-slit camera, the following relationship obtains:

$$\text{Slit width} = K \frac{\text{camera rate}}{\text{light}}$$

where $K$ = level of constant exposure.

In the apparatus described, within the camera 10, the velocity of the exposure slit 11, relative to the film and image, is proportional to the repetition rate or cycling rate of the camera. For any given light level, the signal voltage developed by the tachometer 14 across the resistance device 15 also varies proportionately to the velocity of the exposure slit relative to the film, that is, to the camera repetition rate or cycling. Therefore, as this rate is varied as desired, the excitation of the winding 20a of the torque motor 20 will vary proportionately, in turn varying the torque developed by the motor 20 and thus the adjustment of the camera slit 11 by the mechanism 13.

On the other hand, for any given camera cycling rate, the tachometer 14 in combination with the dropping resistor 22 comprises an approximately constant-current source, while variation in the brightness of the scene being photographed causes a variation in the resistance of the device 15 which is approximately inversely proportional to the brightness of the scene. As the resistance of the device 15 thus varies, the voltage across it applied to the base of the transistor 18 varies proportionately. Therefore, as the scene becomes brighter, the voltage across the device 15 decreases, the excitation of the winding 20a is reduced accordingly, and, in turn, the torque output of the motor 20 which is connected to the slit 11 is reduced proportionally so that the spring 21, whose torque must always balance that produced by torque motor 20, drives the mechanism 13 in a sense to reduce the slit width. Conversely, in the event the brightness of the scene being photographed decreases, the width of the slit 11 will be correspondingly increased to compensate therefor to maintain substantially constant exposure. The effects of variations in the camera cycling rate and the brightness of the scene being photographed are independent of each other so that the automatic exposure control apparatus of the invention responds to variations of either or both simultaneously.

In the event it is desired to take single pictures which may each be individually initiated, the clutch between the motor 12 and the exposure slit 11 may be disengaged, the motor 12 then caused to run at the desired speed prior to the taking of a picture, and the clutch 23 then engaged to drive the slit to make an exposure and then disengaged again. In this way, the signal provided by the tachometer generator 14 is still representative of the desired quantity, i.e., the velocity of the exposure slit relative to the film during the single exposure.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An automatic exposure control apparatus for an adjustable-aperture camera including a driven exposure aperture comprising:
   means for adjusting the aperture of the camera;
   means for developing an electrical signal representative of the relative exposure aperture-film velocity;
   a light-responsive variable impedance device;
   means for illuminating said device from the scene being photographed;
   a circuit for applying said signal to said device;
   and means responsive to the signal translated by said device for actuating said adjusting means in a sense tending to maintain the camera exposure constant.

2. An automatic exposure control apparatus for a repeating adjustable-aperture camera comprising:
   means for adjusting the aperture of the camera;
   means for developing an electrical signal representative of the repetition rate of the camera;
   a light-responsive variable impedance device;
   means for illuminating said device from the scene being photographed;
   a circuit for applying said signal to said device;
   and means responsive to the signal translated by said device for actuating said adjusting means in a sense tending to maintain the camera exposure constant.

3. An automatic exposure control apparatus for an adjustable-slit focal-plane camera including a driven exposure slit comprising:
   means for adjusting the exposure slit of the camera;
   means for developing an electrical signal representative of the relative exposure slit-film velocity;
   a light-responsive variable impedance device;
   means for illuminating said device from the scene being photographed;
   a circuit for applying said signal to said device;
   and means responsive to the signal translated by said device for actuating said adjusting means in a sense tending to maintain the camera exposure constant.

4. An automatic exposure control apparatus for a repeating adjustable-aperture camera including an exposure-aperture driving mechanism comprising:
   means for adjusting the aperture of the camera;
   a tachometer generator coupled to the camera driving mechanism for developing an electrical signal representative of the relative exposure aperture-film velocity;
   a light-responsive variable impedance device;
   means for illuminating said device from the scene being photographed;
   a circuit for applying said signal to said device;
   and means responsive to the signal translated by said device for actuating said adjusting means in a sense tending to maintain the camera exposure constant.

5. An automatic exposure control apparatus for an adjustable-aperture camera including a driven exposure aperture comprising:
   means for adjusting the aperture of the camera;
   means for developing an electrical signal representative of the relative exposure aperture-film velocity;
   a photosensitive resistance device;
   means for illuminating said device from the scene being photographed;
   a circuit for applying said signal to said device;
   and means responsive to the signal voltage across said device for actuating said adjusting means in a sense tending to maintain the camera exposure constant.

6. An automatic exposure control apparatus for an adjustable-aperture camera including a driven exposure aperture comprising:
   means for adjusting the aperture of the camera;
   means for developing an electrical signal representative of the relative exposure aperture-film velocity;
   a resistance device having a resistance varying approximately inversely with illumination;
   means for illuminating said device from the scene being photographed;
   a circuit for applying said signal to said device;
   and means responsive to the signal voltage across said device for actuating said adjusting means in a sense tending to maintain the camera exposure constant.

7. An automatic exposure control apparatus for an adjustable-aperture camera including a driven exposure aperture comprising:
   means for adjusting the aperture of the camera;
   means for developing an electrical signal representative of the relative exposure aperture-film velocity;
   a light-responsive variable impedance device;
   means for illuminating said device from the scene being photographed;
   a circuit for applying said signal to said device;
   a signal repeater responsive to the signal translated by said device;
   and a torque motor coupled to said repeater for actuating said adjusting means in a sense tending to maintain the camera exposure constant.

References Cited
UNITED STATES PATENTS

| 2,599,517 | 6/1952 | Raspet | 95—12.5 |
| 3,016,810 | 1/1962 | Oxspring et al. | 95—10 |
| 3,124,033 | 3/1964 | Freudenschuss | 352—141 |
| 3,116,670 | 1/1964 | Ball | 95—57 X |
| 3,277,803 | 10/1966 | Fukouka | 95—10 |

NORTON ANSHER, *Primary Examiner.*

J. F. PETERS, *Assistant Examiner.*